United States Patent
Nakano et al.

(10) Patent No.: US 7,507,436 B2
(45) Date of Patent: Mar. 24, 2009

(54) ELECTROCONDUCTIVE CELLULOSE-BASED FILM, A METHOD OF PRODUCING THE SAME, AN ANTI-REFLECTION FILM, AN OPTICAL ELEMENT, AND AN IMAGE DISPLAY

(75) Inventors: Shinya Nakano, Ibaraki (JP); Hiroyuki Takao, Ibaraki (JP); Masahiro Yoshioka, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 854 days.

(21) Appl. No.: 10/882,453

(22) Filed: Jul. 1, 2004

(65) Prior Publication Data

US 2005/0003081 A1    Jan. 6, 2005

(30) Foreign Application Priority Data

Jul. 4, 2003    (JP) ............................. 2003-192105

(51) Int. Cl.
    *B05D 5/06* (2006.01)
(52) U.S. Cl. ....................... 427/162; 428/343
(58) Field of Classification Search ................ 427/162; 428/343
    See application file for complete search history.

(56) References Cited

U.S. PATENT DOCUMENTS 5,103,038 A * 4/1992 Chen et al. ................. 558/426
6,463,760 B1 * 10/2002 Fink-Straube et al. ........ 65/17.2
7,163,739 B2 * 1/2007 Koike et al. ................. 428/343

FOREIGN PATENT DOCUMENTS

| JP | 10-142401 | 5/1998 |
| JP | 10-148822 | 6/1998 |
| JP | 2002-524761 | 8/2002 |

OTHER PUBLICATIONS

Partial machine translation of JP-10148822; 2008; JPO; pp. 1-7.*
Partial machine translation of JP-10142401; 2008; JPO; pp. 1-10.*

* cited by examiner

*Primary Examiner*—Alain L Bashore
(74) *Attorney, Agent, or Firm*—Knobbe Martens Olson & Bear LLP

(57) ABSTRACT

The present invention relates to a method of producing an electroconductive cellulose-based film having high uniformity and transparency and excellent in optical properties while preventing a bleaching phenomenon at the time of forming an electroconductive layer. The method of producing an electroconductive cellulose-based film according to the present invention is a method of producing an electroconductive cellulose-based film by coating a cellulose-based film with a coating solution containing a binder, superfine particles and a solvent to form an electroconductive layer thereon, wherein the coating solution comprises at least one kind of glycol monoalkyl ether-based solvent selected from the group consisting of ethylene glycol monomethyl ether, ethylene glycol monoethyl ether, propylene glycol monomethyl ether, and propylene glycol monoethyl ether in an amount of 20 to 40% by weight based on the total solvent, and a ketone-based solvent in an amount of 20 to 50% by weight based on the total solvent.

8 Claims, No Drawings

ELECTROCONDUCTIVE CELLULOSE-BASED FILM, A METHOD OF PRODUCING THE SAME, AN ANTI-REFLECTION FILM, AN OPTICAL ELEMENT, AND AN IMAGE DISPLAY

BACKGROUND OF THE INVENTION

1. Field of the Invention

The present invention relates to a method of producing an electroconductive cellulose-based film. The electroconductive cellulose-based film, which in various optical films, is used as a hard coating film having a hard coating layer formed thereon and an anti-reflection film having an anti-reflection layer formed thereon. For example, the film applied to an optical element such as a polarizing plate etc. can be utilized preferably in various image displays such as a liquid crystal display, organic EL display, PDP and CRT. The film can also be used preferably as a constituent member or an attachment member in a polarizing filter, an anti-reflection filter etc.

2. Description of the Related Art

Owing to research and development in recent years, a liquid crystal display panel comes to secure a firm position as display. However, a car-navigation monitor or a video-camera monitor which is used highly frequently under high illumination undergoes a significant reduction in visibility and recognizability because of occurrence of surface reflection. Accordingly, it comes to be essential that a polarizing plate used in the liquid crystal display panel be subjected to with anti-reflection treatment, and the polarizing plate subjected to anti-reflection treatment is used in almost all liquid crystal displays used frequently outdoors.

The anti-reflection treatment is designed so as to achieve the maximum reduction in the reflection, in the visible light range, of a multilayer laminate of plural films made of materials different in refractive index which is prepared generally by a dry process such as vacuum deposition, sputtering and CVD or by a wet process using a die or a gravure roil coater. Particularly, the wet process is used preferably because the cost of facilities is low, a film of large area can be continuously produced, and the process is excellent in productivity.

In the wet process, however, a small amount of water may be mixed in a coating solution in the coating operation, in preparation of the coating solution, and depending on the humidity of an atmosphere for storage. In this case, there has been a problem that a lower boiling organic solvent in the organic solvent starts evaporation in a drying step after application of the coating solution so that as the evaporation proceeds, the solubility of water in the organic solvent reaches a saturation state to cause phase separation, and during this process, hydrophilic superfine particles are transferred predominantly to the aqueous phase where they are aggregated to cause bleaching, thus significantly deteriorating optical properties such as transmittance.

SUMMARY OF THE INVENTION

The present invention is to solve the problem described above, and an object of the present invention is to provide a method of producing an electroconductive cellulose-based film having high uniformity and transparency and excellent in optical properties while preventing a bleaching phenomenon at the time of forming an electroconductive layer, as well as an electroconductive cellulose-based film. Another object of the present invention is to provide an anti-reflection film and an optical element using the electroconductive cellulose-based film, as well as an image display mounted with the optical element etc.

As a result of extensive study for solving the problem described above, the present inventors found that the objects described above can be achieved by the production method described below, leading to the completion of the present invention.

That is, the present invention relates to a method of producing an electroconductive cellulose-based film by coating a cellulose-based film with a coating solution containing a binder, superfine particles and a solvent to form an electroconductive layer thereon, wherein the coating solution comprises at least one kind of glycol monoalkyl ether-based solvent selected from the group consisting of ethylene glycol monomethyl ether, ethylene glycol monoethyl ether, propylene glycol monomethyl ether, and propylene glycol monoethyl ether in an amount of 20 to 40% by weight based on the total solvent, and a ketone-based solvent in an amount of 20 to 50% by weight based on the total solvent.

In the present invention, the coating solution contains predetermined amounts of a specific glycol monoalkyl ether-based solvent and ketone-based solvent which form an azeotropic mixture with water so that in a drying step after applying the coating solution, the phase separation of the organic solvent from water does not occur and the superfine particles are prevented from being transferred to the aqueous phase where they may be aggregated to cause bleaching. Accordingly, an electroconductive cellulose-based film excellent in uniformity and transparency without deteriorating optical properties such as transmittance can be obtained.

Preferably, the content of the glycol monoalkyl ether-based solvent is 20 to 30% by weight based on the total solvent. It is not preferable that the content of the glycol monoalkyl ether-based solvent is lower than 20% by weight based on the total solvent, because separation of the organic phase from the aqueous phase occurs in the drying step after coating, to permit the superfine particles to be transferred to the aqueous phase where they are aggregated to cause bleaching. It is not preferable that the content of the glycol monoalkyl ether-based solvent is higher than 40% by weight based on the total solvent, because the adhesion of the cellulose-based film to the electroconductive layer is reduced, or the binder is hardly dissolved.

Preferably, the content of the ketone-based solvent is 20 to 30% by weight based on the total solvent. Because the ketone-based solvent has a high boiling point, the proportion of the ketone-based solvent in the solvent is increased during drying thereof so that while a part of the cellulose-based film is dissolved in the ketone-based solvent, the binder is cured to form an electroconductive layer. As a result, an electroconductive layer excellent in adhesion can be formed. When the ratio of the ketone-based solvent to the total solvent is lower than 20% by weight, the adhesion of the electroconductive layer to the cellulose-based film tends to be insufficient. On the other hand, when the ratio of the ketone-based solvent to the total solvent is higher than 50% by weight, the cellulose-based film is dissolved in excess so that bleaching of the electroconductive layer tends to occur.

In the present invention, the coating solution contains at least one kind of alcohol-based solvent in an amount of preferably 10 to 60% by weight, more preferably 40 to 60% by weight, based on the total solvent. Because the ability of the alcohol-based solvent to dissolve the binder in the electroconductive layer is high, the alcohol-based solvent is preferably simultaneously used.

Another aspect of the invention relates to a method of producing an electroconductive cellulose-based film by coating a cellulose-based film with a coating solution containing a binder, superfine particles and a solvent to form an electroconductive layer thereon, wherein the coating solution comprises at least two kinds of azeotropic organic solvents in an amount of 5 to 40% by weight based on the total solvent. In this aspect of the invention, the same effect as described above can be achieved by using at least two kinds of azeotropic organic solvents in a specific amount in the coating solution.

Preferably, the superfine particles are superfine metal oxide particles. An electroconductive layer excellent in adhesiveness and antistatic properties can be given by using superfine metal oxide particles as electroconductive superfine particles.

The present invention also relates to an electroconductive cellulose-based film obtained by the production method described above. The electroconductive cellulose-based film can be used as a hard coating film having a hard coating layer formed on an electroconductive layer. The electroconductive cellulose-based film can be endowed with anti-glare properties by making the surface of the hard coating layer uneven.

The electroconductive cellulose-based film can be used as an anti-reflection film having an anti-reflection layer formed directly or via another layer (hard coating layer) on the electroconductive layer.

Further, the present invention relates to an optical element comprising the electroconductive cellulose-based film or the anti-reflection film formed on one side or both sides of the optical element. In addition, the present invention relates to an image display mounted with the electroconductive cellulose-based film, the anti-reflection film or the optical element.

DETAILED DESCRIPTION OF THE INVENTION

In the present invention, a cellulose-based film is coated with a coating solution containing a binder, superfine particles and a solvent to form an electroconductive layer thereon. Hereinafter, preferable embodiments of the invention are described.

The material of the cellulose-based film includes cellulose-based polymers such as diacetyl cellulose and triacetyl cellulose. The thickness of the cellulose-based film can be suitably determined, but from the viewpoint of strength and operativeness such as handling and for a thinner layer, the thickness is preferably about 10 to 300 μm. Particularly, the thickness is preferably 20 to 300 μm, more preferably 30 to 200 μm. The surface of the cellulose-based film can be subjected to surface treatment such as saponification treatment, corona discharge treatment, sputtering treatment, low-pressure UV irradiation and plasma treatment.

The binder in the coating solution is not particularly limited, but alkoxysilane and/or a condensate thereof is preferably used. The alkoxysilane is thermally cured to form a polysiloxane structure. Examples of the alkoxysilane include tetraalkoxysilanes such as tetramethoxysilane, tetraethoxysilane, tetrapropoxysilane, tetraisopropoxysilane and tetrabutoxysilane, trialkoxysilanes such as methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, vinyltrimethoxysilane, vinyltriethoxysilane, 3-glycidoxypropyltrimethoxysilane, 3-glycidoxypropyltriethoxysilane, 3-mercaptopropyltrimethoxysilane, 3-mercaptopropyltriethoxysilane, phenyltrimethoxysilane, phenyltriethoxysilane, 3,4-epoxycyclohexylethyltrimethoxysilane and 3,4-epoxycyclohexylethyltriethoxysilane, as well as dimethyldimethoxysilane, dimethyldiethoxysilane, diethyldimethoxysilane, diethyldiethoxysilane etc. Such alkoxysilanes can be used in the form of partial condensates thereof. Particularly, tetraalkoxysilanes or partial condensates thereof are preferable. Particularly, tetramethoxysilane, tetraethoxysilane or a partial condensate thereof is preferable.

The superfine particles are not particularly limited insofar as they are electroconductive, but superfine metal oxide particles are preferably used. Examples of the superfine metal oxide particles include superfine metal oxide particles of high refractive index, such as antimony oxide, selenium oxide, titanium oxide, tungsten oxide, tin oxide, antimony-doped tin oxide, phosphorus-doped tin oxide, zinc oxide, zinc antimonate and tin-doped indium oxide. The superfine metal oxide particles are preferably sol particles based on a highly electroconductive metal oxide selected from tin oxide, antimony oxide and indium oxide such as antimony-doped tin oxide, phosphorous-doped tin oxide, zinc antimonate and tin-doped indium oxide. In particular, antimony-doped tin oxide excellent in coating stability and sol reproducibility is preferable. The superfine oxide metal particles are superfine particles having an average particle diameter of preferably 80 nm or less, more preferably 60 nm or less. When the average particle diameter is greater than 80 nm, transparency generally tends to be inferior with higher haze. To obtain highly dispersible sol, the superfine particles dispersed in a dispersant such as water, alcohol, ester or hydrocarbon are generally used.

As the solvent, at least one kind of glycol monoalkyl ether-based solvent selected from the group consisting of ethylene glycol monomethyl ether, ethylene glycol monoethyl ether, propylene glycol monomethyl ether, and propylene glycol monoethyl ether, and a ketone-based solvent are used.

Preferable examples of the ketone-based solvent include acetone, methyl ethyl ketone, diethyl ketone, methyl isobutyl ketone, cyclohexanone, cyclopentanone etc. Among these solvents, cyclohexanone is preferable.

Together with the above solvent, a suitable combination of one or more kinds of solvents such as aromatic solvent, ester-based solvent, alcohol-based solvent, amide-based solvent, sulfoxide-based solvent and ether-based solvent can be added to the coating solution. Among these solvents, an alcohol-based solvent is preferably used. Examples of the alcohol-based solvent include methanol, ethanol, n-propyl alcohol, i-propyl alcohol, n-butanol, i-butanol, t-butanol etc.

In another aspect of the invention, at least two kinds of azeotropic organic solvents are used as the solvent. The azeotropic organic solvents are for example a combination of an alcohol such as methanol or ethanol and at least one kind selected from the group consisting of methyl ethyl ketone, ethyl acetate, benzene, hexane, toluene and methylene chloride. Particularly, a combination of an alcohol and methyl ethyl ketone is preferable.

In addition to the binder, the superfine particles and the solvent, a curing catalyst for alkoxysilane can be used in the coating solution. Examples of the curing catalyst include organic acid catalysts such as formic acid, acetic acid, propionic acid, p-toluenesulfonic acid and methanesulfonic acid, tin-based catalysts such as dibutyltin laurate and tin octylate, inorganic acid catalysts such as boric acid and phosphoric acid, and alkaline catalysts. Further, various additives used in the electroconductive layer can be incorporated into the coating solution.

The solids content of the coating solution is regulated in the range of preferably about 1 to 10% by weight, more preferably 1 to 3% by weight. The ratio of the superfine particles to the binder in the coating solution is regulated preferably such that the content of the superfine particles in the electroconductive layer formed by the coating solution is about 40 to 95% by weight.

The coating solution is applied onto a cellulose-based film and then cured by evaporating the solvent, to form an electroconductive layer. When alkoxysilane and/or a condensate thereof as the binder is curable with UV rays, it can be cured with UV rays after thermal curing. The method of applying the coating solution is not particularly limited, and various methods such as dipping, gravure coating, spin coating and slot die coating can be used. The thickness of the electroconductive layer is usually 0.01 to 0.5 µm, preferably 0.05 to 0.2 µm.

On the electroconductive layer, a hard coating layer can be formed. A resin forming the hard coating layer is not particularly limited insofar as it is excellent in hard coating properties (hardness of H or more in a pencil hardness test JIS K5400), has sufficient strength and excellent in light transmittance. For example, thermosetting resin, thermoplastic resin, UV-curable resin, electron ray-curable resin, two-pack resin etc. can be mentioned. Among these resins, the UV-curable resin which can form a hard coating layer efficiently by irradiation with UV rays in a simple processing operation is preferable. Examples of the UV-curable resin include various kinds of resins based on polyester, acryl, urethane, amide, silicone and epoxy, and contains UV-curable monomers, oligomers and polymers. Preferable examples of the UV-curable resin to be used include a resin containing an acrylic monomer or oligomer component having a UV-polymerizable functional group, particularly 2 or more, especially 3 to 6 functional groups. The UV-curing resin is blended with a UV polymerization initiator.

The transparent resin solution is applied by a bar coater such as a wire bar, microgravure coater or die coater, or by a suitable method such as casting, spin coating or fountain metaling. Examples of the solvent in which the transparent resin is dissolved include general solvents such as toluene, ethyl acetate, butyl acetate, methyl ethyl ketone, methyl isobutyl ketone, isopropyl alcohol and ethyl alcohol. The thickness of the hard coating layer is not particularly limited, but is preferably about 1 to 10 µm, more preferably 2 to 5 µm.

The hard coating layer can be rendered highly refractive by adding highly refractive superfine metal or metal oxide particles. Examples of the highly refractive superfine particles include superfine particles of metal oxides such as $TiO_2$, $SnO_2$, $ZnO_2$, $ZrO_2$, aluminum oxide and zinc oxide. Preferably, the average particle diameter of such superfine particles is usually about 0.1 µm or less. The highly refractive superfine particles can be dispersed almost uniformly in the hard coating layer.

The surface of the hard coating layer can be endowed with anti-glare properties by making the surface of the hard coating layer finely uneven. The surface of the hard coating layer can be endowed with anti-glare properties by light diffusion on the surface rendered uneven. Light diffusion on the surface is also preferable to reduce refractive index.

The method of rendering the surface finely uneven is not particularly limited, and various methods can be used. For example, there is a method that the surface of a transparent substrate film used in forming the hard coating layer is previously roughened and rendered finely uneven by a suitable method such as sandblasting, emboss rolling or chemical etching, whereby the surface of the material itself forming the hard coating layer is rendered finely uneven. Alternatively, there is a method that a hard coating layer is applied onto the hard coating layer, and the surface of the resin coating layer is rendered finely uneven by, for example, a transfer system with a mold. There is also a method wherein organic or inorganic spherical or amorphous fillers are dispersed and contained in the hard coating layer to render the surface finely uneven. As the method of rendering the surface of the layer finely uneven, two or more methods may be combined to provide a layer with a surface rendered finely uneven in different states.

From the viewpoint of formability etc., the method of forming a hard coating layer having a finely uneven surface is preferably a method that involves arranging a hard coating layer containing organic or inorganic spherical or amorphous fillers dispersed therein. The organic or inorganic spherical or amorphous fillers include, for example, crosslinked or non-crosslinked organic fine particles made of various polymers such as PMMA (polymethyl methacrylate), polyurethane, polystyrene, and melamine resin, inorganic particles such as those of glass, silica, alumina, calcium oxide, titania, zirconium oxide and zinc oxide, and electroconductive inorganic particles such as those of tin oxide, indium oxide, cadmium oxide and antimony oxide, or complexes thereof. The average particle diameter of the fillers (including both primary and secondary particles) is preferably 0.5 to 10 µm, more preferably 1 to 5 µm. When the surface is rendered finely uneven with the fine particles, the amount of the fine particles to be used is preferably about 1 to 30 parts by weight relative to 100 parts by weight of the resin.

For formation of the hard coating layer (anti-glare layer), additives such as a leveling agent, a thixotropic agent and an antistatic may be contained therein. In forming the hard coating layer (anti-glare layer), a thixotropic agent (0.1 µm or less of silica, mica etc.) can be contained therein to render the surface of the anti-glare layer finely uneven easily with the protrusive particles.

An anti-reflection layer can be formed on the electroconductive layer or the hard coating layer. The method of forming the anti-reflection layer is not particularly limited, but as compared with a vacuum deposition method etc., a wet coating method using a material of low refractive index is easy and preferable. The material forming the anti-reflection layer includes, for example, resinous materials such as UV-curable acrylic resin, hybrid materials having inorganic fine particles such as colloidal silica dispersed in resin, and sol-gel materials using metal alkoxides such as tetraethoxysilane and titanium tetraethoxide. As the respective materials, a fluorine-containing compound is used in order to confer anti-fouling properties on the surface. Materials of low refractive index containing a large amount of inorganic components are often excellent in resistance to scuffing, and particularly sol-gel materials are preferable. The sol-gel materials can be partially condensed for use.

The fluorine-containing sol-gel materials can be exemplified by perfluoroalkylalkoxysilane. The perfluoroalkylalkoxysilane includes, for example, compounds represented by the general formula (1):

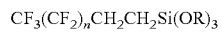

$$CF_3(CF_2)_nCH_2CH_2Si(OR)_3$$

wherein R represents an alkyl group having one to five carbon atoms, and n is an integer of 0 to 12. Specific examples include trifluoropropyltrimethoxysilane, trifluroropropyltriethoxysilane, tridecafluorooctyltrimethoxysilane, tridecafluorooctyltriethoxysilane, heptadecafluorodecyltrimethoxysilane, and heptadecafluorodecyltriethoxysilane. Among these compounds, compounds wherein n is 2 to 6 are preferable.

Sol having silica, alumina, titania, zirconia, magnesium fluoride or ceria dispersed in an alcohol solvent may be added in the anti-reflection layer. In addition, additives such as metal salts and metallic compounds may be suitably incorporated into the anti-reflection layer.

The refractive index of the anti-reflection layer is preferably 1.35 to 1.45.

The method of forming the anti-reflection layer is not particularly limited, and the anti-reflection layer can be formed by a suitable method such as a doctor blade method, a gravure roll coater method or a dipping method.

The thickness of the anti-reflection layer is not particularly limited, and is usually about 80 to 150 nm on average. The thickness of the anti-reflection layer is determined so as to achieve an objective wavelength or thereabout by the refractive index of a material to be used and the established wavelength of incident light.

An optical element can be stuck on the side in which the electroconductive layer of the electroconductive cellulose-based film is not formed.

As example of optical elements, a polarizer may be mentioned. The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and In water bath.

A transparent protective film is usually provided on one side or both sides of the above described polarizer to be used as a polarizing plate. As a transparent protective film, materials excellent in transparency, mechanical strength, heat stability, water shielding property, isotropy, etc. are preferable. As transparent protective films, a film of same material as the transparent base film in the above described illustration may be used. As the above described transparent protective film, a transparent protective film whose both sides, surface side and backside, are formed from same polymer material may be used, and also a transparent protective film whose both sides are formed by different polymer materials etc. may be used. As transparent protective films here, transparent protective films having excellent transparency, mechanical strength, thermal stability, and moisture barrier property may preferably be used. And transparent protective films having smaller optical anisotropy, such as retardation, are more preferable in many cases. As polymer for forming the transparent protective film, triacetyl cellulose is most suitable. When the anti-reflection films are prepared on one side or both sides of a polarizer (polarizing plate), a transparent base film of the anti-reflection film may also serve as a transparent protective film of the polarizer. A thickness of the transparent protective film is not especially limited, and it is about 10 to 300 μm in general.

In an anti-reflection polarizing plate having a polarizing plate laminated on an anti-reflection film, a transparent protective film, a polarizer, and a transparent protective film may be laminated in this sequential order on the anti-reflection film, a polarizer and a transparent protective film may be laminated in this sequential order on an anti-reflection film.

As the opposite side of the polarizing-adhering surface above-mentioned transparent protective film, a film with a hard coat layer and various processing aiming for sticking prevention and diffusion or anti glare may be used. A hard coat processing is applied for the purpose of protesting the surface of the polarization plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Besides, a sticking prevention processing is applied for the purpose of adherence prevention with adjoining layer. In addition, the above described hard coat layer and sticking prevention layer etc. may be built in the protection film itself, and also they may be prepared as an optical layer different from the protection layer.

Moreover, for example, a hard coat layer, a primer layer, an adhesive layer, a pressure sensitive adhesive layer, an antistatic layer, an electrically conductive layer, a gas barrier layer, a steam barrier layer, a moisture barrier layer, etc. may be inserted in between layers of polarizing plates, or these may be laminated on a surface of the polarizing plate. Besides, in a stage for forming each layer of the polarizing plate, for example, if required, various characteristics may be improved by adding or mixing conductive particles, antistatic agents, various particles, plasticizers, etc. into forming materials of each layer.

As optical elements, an optical film in which other optical elements (optical layers) is laminated to the above described polarizing plate may be used on the occasion of practical use. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate. Anti-reflection film is provided onto a polarizing plate side in an elliptically polarizing plate and a polarizing plate with optical compensation, etc.

Furthermore, there may be given, if needed, treatments for giving various characteristics and functions, such as abrasion resistance, durability, weather resistance, wet heat resistance, heat resistance, moisture resistance, moisture permeability, antistatic properties, conductivity, improvement in adhesion property between layers, improvement in mechanical strength etc. or functional layers may be inserted therein, or laminated thereon.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of anti-reflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability In lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a biaxial stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although a laminating of the above described anti-reflection film to the optical element and of the various optical layer to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, which at least one layer of the optical element is laminated with the anti-reflection film, while a layer not prepared the anti-reflection film an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains particle and shows optical diffusion nature.

Proper method may be carried out to attach an adhesive layer to the optical element, such as the polarizing plate, the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or a optical film top using suitable developing methods, such as flow method and coating method, or a method in which an adhesive layer is once formed on a separator, as mentioned above, and is then transferred on a polarizing plate or an optical film may be mentioned. An adhesive layer may also be prepared on each layer as a layer in which pressure sensitive adhesives with different composition or different kind etc. are laminated together. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present Invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical element prepared with the anti-reflection film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, anti-reflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent base film in an order configuring an illuminant (organic electro luminescence illuminant). Here, a organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10 nm in thickness. For this reason, light is transmitted nearly completely through organic emitting layer as through transparent electrode. Consequently, since the light that enters, when light is not emitted, as incident light from a surface of a transparent base film and is transmitted through a transparent electrode and an organic emitting layer and then is reflected by a metal electrode, appears in front surface side of the transparent base film again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent base film, the transparent electrode and the organic thin film, and is reflected by the metal electrode, and then is transmitted through the organic thin film, the transparent electrode and the transparent base film again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Hereinafter, the present invention is described in more detail by reference to the Examples, but the present invention is not limited by the Examples. In the Examples, parts and % refer to parts by weight and % by weight, respectively.

Example 1

5 parts of tetraalkoxysilane (thermosetting component in polysiloxane) and 95 parts of superfine ATO particles having a particle diameter of 1 to 20 nm were dissolved in a solvent to prepare a coating solution having a solids content of 1.5%. As the solvent, a mixed solvent containing 20% cyclohexanone, 5% methyl ethyl ketone, 10% methanol, 45% ethanol and 20% propylene glycol monomethyl ether was used.

The coating solution was applied by gravure coating method onto a triacetyl cellulose film of 80 μm in thickness and then thermally cured for 3 minutes in an environment at 130° C. to form a 0.08 μm electroconductive layer, whereby an electroconductive cellulose-based film was prepared.

Example 2

A hard coating layer was formed on the electroconductive layer of the electroconductive cellulose-based film obtained in Example 1. To form the hard coating layer, a coating solution (solids content 40%) wherein 30 parts of acrylic urethane-based UV-curable resin, 70 parts of fine $ZrO_2$ particles having an average particle diameter of 1 to 20 nm, and 5 parts of a UV polymerization initiator (based on benzophenone) had been dissolved in a solvent of 30 parts of methyl ethyl ketone and 70 parts of xylene was used. The coating solution was applied by a die coater, then heated and dried for 3 minutes in an environment at 120° C. and cured by irradiation with UV rays at an intensity of 150 mJ/cm$^2$ from a high-pressure mercury lamp, to form a hard coating layer of 2.2 μm in thickness (refractive index 1.71).

Further, an anti-reflection film was prepared by arranging an anti-reflection layer on the hard coating layer. A fluorine-containing polysiloxane-based thermosetting resin was used in forming the anti-reflection layer. This thermosetting resin was applied by a gravure coater and then cured by heating for 3 minutes in an environment at 120° C., to form an anti-reflection layer of 0.1 μm (refractive index 1.43).

Comparative Example 1

An electroconductive cellulose-based film was prepared in the same manner as in Example 1 except that a solvent containing 20% cyclohexanone, 5% methyl ethyl ketone, 10% methanol, 45% ethanol and 20% isobutanol was used as the solvent in the coating solution to form an electroconductive layer.

Comparative Example 2

An electroconductive cellulose-based film was prepared in the same manner as in Example 1 except that a solvent containing 10% methanol, 30% ethanol and 60% propylene glycol monomethyl ether was used as the solvent in the coating solution to form an electroconductive layer.

Comparative Example 3

An anti-reflection film was prepared in the same manner as in Example 2 except that the electroconductive cellulose-based film obtained in Comparative Example 1 was used in place of the electroconductive cellulose-based film obtained in Example 1.

The electroconductive cellulose-based films or the anti-reflection films obtained in the Examples and Comparative Examples were evaluated as follows. The results are shown in Table 1.

(Haze Value)

The haze value of the electroconductive cellulose-based film was measured according to JIS K7105 by a haze meter (Suga Test Instruments Co., Ltd.).

(Adhesion)

100 cross hatches (1 mm×1 mm) were given to the surface of the electroconductive layer and then subjected twice to peeling with a cellophane tape, and whether hatches were removed or not upon peeling was evaluated according to the following criteria.

○: The number of removed hatches was 10 or less.

X: The number of removed hatches was higher than 10.

(Outward Appearance)

The surface of the anti-reflection layer was examined with naked eyes, and evaluated according to the following criteria.

○: Fogging was not observed.

X: Fogging caused unevenly by bleaching of the electroconductive layer was observed.

TABLE 1

|  | Haze value | Adhesion | Outward appearance |
|---|---|---|---|
| Example 1 | 0.4 | ○ | — |
| Example 2 | — | ○ | ○ |
| Comparative Example 1 | 3.8 | ○ | — |
| Comparative Example 2 | 0.4 | X | — |
| Comparative Example 3 | — | ○ | X |

As is evident from Table 1, it is recognized that the electroconductive cellulose-based films and anti-reflection films excellent in adhesion without defects in the outward appearance are obtained in the Examples.

INDUSTRIAL APPLICABILITY

The electroconductive cellulose-based film of the present invention, which in various optical films, is used as a hard coating film having a hard coating layer formed thereon and an anti-reflection film having an anti-reflection layer formed thereon. For example, the film applied to an optical element such as a polarizing plate etc. can be utilized preferably in various image displays such as a liquid crystal display, organic EL display, PDP and CRT. The film can also be used preferably as a constituent member or an attachment member in a polarizing filter, an anti-reflection filter etc.

What is claimed is:

1. A method of producing an electroconductive cellulose-based film by coating a cellulose-based film with a coating solution containing a binder, superfine particles and a solvent to form an electroconductive layer thereon,
   wherein the coating solution comprises at least one kind of glycol monoalkyl ether containing solvent selected from the group consisting of ethylene glycol monomethyl ether, ethylene glycol monoethyl ether, propylene glycol monomethyl ether, and propylene glycol monoethyl ether in an amount of 20 to 40% by weight based on the total solvent, and a ketone-containing solvent in an amount of 20 to 50% by weight based on the total solvent,
   wherein the superfine oxide metal particles have an average particle diameter of 80 nm or less.

2. The method of producing an electroconductive cellulose-based film according to claim 1, wherein the coating solution further comprises an alcohol-containing solvent in an amount of 10 to 60% by weight based on the total solvent.

3. A method of producing an electroconductive cellulose-based film by coating a cellulose-based film with a coating solution containing a binder, superfine particles and a solvent to form an electroconductive layer thereon,
   wherein the coating solution comprises at least two different azeotropic organic solvents in an amount of 5 to 40% by weight based on the total solvent, wherein the first of said at least two different azeotropic organic solvents is an alcohol, and the second of said at least two different azeotropic organic solvents is selected from the group consisting of methyl ethyl ketone, ethyl acetate, benzene, hexane, toluene and methylene chloride,
   wherein the superfine oxide metal particles have an average particle diameter of 80 nm or less.

4. The method of producing an electroconductive cellulose-based film according to any one of claims 1 to 3, wherein the superfine particles are superfine metal oxide particles.

5. A method of producing an electroconductive cellulose-containing film, comprising applying on a cellulose-containing film a coating solution containing a binder, superfine particles, and a solvent, thereby forming an electroconductive layer thereon,
   said solvent comprising at least one glycol monoalkyl ether-containing solvent selected from the group consisting of ethylene glycol monomethyl ether, ethylene glycol monoethyl ether, propylene glycol monomethyl ether, and propylene glycol monoethyl ether in an amount of 20% to 40% by weight based on the total solvent, and a ketone-containing solvent in an amount of 20% to 50% by weight based on the total solvent,
   wherein the superfine oxide metal particles have an average particle diameter of 80 nm or less.

6. The method according to claim 5, wherein the coating solution further comprises at least one alcohol-containing solvent in an amount of 10 to 60% by weight based on the total solvent.

7. A method of producing an electroconductive cellulose-containing film, comprising applying on a cellulose-containing film a coating solution containing a binder, superfine particles, and a solvent, thereby forming an electroconductive layer thereon,
   said solvent comprising at least two of azeotropic organic solvents in an amount of 5% to 40% by weight based on the total solvent, wherein the first of said at least two azeotropic organic solvents is an alcohol, and the second of said at least two azeotropic organic solvents is selected from the group consisting of methyl ethyl ketone, ethyl acetate, benzene, hexane, toluene and methylene chloride,
   wherein the superfine oxide metal particles have an average particle diameter of 80 nm or less.

8. The method according to one of claim 5 to 7, wherein the superfine particles are superfine metal oxide particles.

* * * * *

UNITED STATES PATENT AND TRADEMARK OFFICE
CERTIFICATE OF CORRECTION

PATENT NO. : 7,507,436 B2  Page 1 of 1
APPLICATION NO. : 10/882453
DATED : March 24, 2009
INVENTOR(S) : Shinya Nakano et al.

It is certified that error appears in the above-identified patent and that said Letters Patent is hereby corrected as shown below:

At Column 1, Line 39, please delete "roil" and insert --roll--, therefor.

At Column 4, Line 52, please delete "ethyl acetate," and insert --ethyl acrylate, ethyl acetate--, therefor.

At Column 7, Line 50, please delete "In" and insert --in--, therefor.

At Column 8, Line 20, please delete "protesting" and insert --protecting--, therefor.

At Column 10, Line 42 (approximately), please delete "In" and insert --in--, therefor.

At Column 14, Line 3, please delete "Invention,", and insert --invention,--, therefor.

Signed and Sealed this

Sixteenth Day of November, 2010

David J. Kappos
*Director of the United States Patent and Trademark Office*